(12) United States Patent
Li et al.

(10) Patent No.: US 11,284,292 B2
(45) Date of Patent: Mar. 22, 2022

(54) QUEUING LATENCY AWARE BUFFER STATUS REPORT

(71) Applicant: Apple Inc., Cupertino, CA (US)

(72) Inventors: Guoqing Li, Campbell, CA (US); Jarkko L. Kneckt, Los Gatos, CA (US); Yong Liu, Campbell, CA (US); Jinjing Jiang, Cupertino, CA (US); Tianyu Wu, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 80 days.

(21) Appl. No.: 16/701,267

(22) Filed: Dec. 3, 2019

(65) Prior Publication Data

US 2020/0413285 A1 Dec. 31, 2020

Related U.S. Application Data

(60) Provisional application No. 62/868,432, filed on Jun. 28, 2019.

(51) Int. Cl.
*H04W 28/02* (2009.01)
*H04W 28/06* (2009.01)
*H04W 76/11* (2018.01)
*H04W 80/02* (2009.01)

(52) U.S. Cl.
CPC ... *H04W 28/0278* (2013.01); *H04W 28/0268* (2013.01); *H04W 28/06* (2013.01); *H04W 76/11* (2018.02); *H04W 80/02* (2013.01)

(58) Field of Classification Search
None
See application file for complete search history.

(56) References Cited

U.S. PATENT DOCUMENTS

| | | | | |
|---|---|---|---|---|
| 2008/0232260 A1* | 9/2008 | Yeo | ............ | H04W 72/1252 370/242 |
| 2011/0242972 A1* | 10/2011 | Sebire | ............ | H04W 28/12 370/229 |
| 2013/0094455 A1* | 4/2013 | Wu | ............ | H04W 28/0278 370/329 |
| 2015/0334737 A1* | 11/2015 | Susitaival | ............ | H04W 24/02 370/329 |
| 2016/0014803 A1* | 1/2016 | Merlin | ............ | H04W 74/06 370/236 |

(Continued)

OTHER PUBLICATIONS

Kumara Swamy. "LTE: Buffer Status Reporting Procedure". http://howltestuffworks.blogspot.com/2014/06/buffer-status-reporting-procedure.html (Jun. 2016) (Year: 2016).*

*Primary Examiner* — Andre Tacdiran
(74) *Attorney, Agent, or Firm* — Sterne, Kessler, Goldstein & Fox P.L.L.C.

(57) ABSTRACT

Some embodiments of this disclosure include apparatuses and methods for implementing a queuing latency aware buffer status report (BSR). For example, some embodiments relate to an electronic device including a transceiver and one or more processors communicatively coupled to the transceiver. The one or more processors determine an amount of data queued in a buffer for transmission over the wireless network and determine latency information associated with the queued data. The one or more processors generate a queuing latency aware buffer status report (BSR) based at least on the determined latency information. The electronic device transmits the queuing latency aware BSR to an access point.

16 Claims, 8 Drawing Sheets

(56) References Cited

U.S. PATENT DOCUMENTS

| | | | | |
|---|---|---|---|---|
| 2017/0126461 A1* | 5/2017 | Li | .......... | H04W 28/18 |
| 2017/0230860 A1* | 8/2017 | Li | .......... | H04W 28/0278 |
| 2019/0223219 A1* | 7/2019 | Ahn | .......... | H04W 74/002 |
| 2020/0077293 A1* | 3/2020 | Lee | .......... | H04W 72/1284 |
| 2020/0229055 A1* | 7/2020 | Chien | .......... | H04W 36/0033 |
| 2020/0296620 A1* | 9/2020 | Tang | .......... | H04W 28/0278 |
| 2020/0344640 A1* | 10/2020 | Wu | .......... | H04W 72/1284 |

* cited by examiner

QUEUING LATENCY AWARE BUFFER STATUS REPORT

CROSS-REFERENCE TO RELATED APPLICATIONS

The present application claims the benefit of U.S. Provisional Patent Application No. 62/868,432, filed on Jun. 28, 2019, which is hereby incorporated by reference in its entirety.

BACKGROUND

Field

The described embodiments generally relate to channel access in wireless communications. For example, the embodiments of this disclosure relate to a buffer status report that includes queuing latency information.

Related Art

Using scheduling in uplink (UL) multiuser (MU) transmissions can improve network efficiency. For example, UL MU transmissions can be based on an UL MU scheduling to reduce the contention from individual stations (STAs) to improve the network efficiency.

SUMMARY

Some embodiments of this disclosure include apparatuses and methods for implementing a queuing latency aware buffer status report (BSR). The queuing latency aware BSR of the embodiments of this disclosure includes latency information in addition to buffer size. The queuing latency aware BSR can include information that assists the access point (AP) to improve its UL MU scheduling. For example, the queuing latency aware BSR of the embodiments of this disclosure assists the AP to better utilize channel resources and better serve the stations (STA) to minimize the STAs' traffic latency.

Some embodiments relate to an electronic device. The electronic device includes a transceiver configured to communicate over a wireless network and one or more processors communicatively coupled to the transceiver. The one or more processors determine an amount of data queued in a buffer for transmission over the wireless network and determine latency information associated with the queued data. The one or more processors generate a queuing latency aware buffer status report (BSR) based at least on the determined latency information. The electronic device transmits the queuing latency aware BSR to an access point.

Some embodiments relate to a method including receiving a frame from an access point, where the frame comprises one or more parameters. The method further includes determining an amount of data queued in a buffer for transmission over a wireless network associated with the access point and determining latency information associated with the queued data. The latency information includes a queuing time associated with the queued data. The method further includes, in response to the latency information being within the one or more parameters, generating a queuing latency aware buffer status report (BSR) based at least on the determined latency information and transmitting the queuing latency aware BSR to an access point.

Some embodiments relate to a non-transitory computer-readable medium storing instructions. When the instructions are executed by a processor of an electronic device, the instructions cause the processor to perform operations including determining latency information associated with data queued in a buffer for transmission over a wireless network. The latency information includes a queuing time associated with the queued data, time-to-live information associated with the queued data indicating a deadline when the queued data is to be transmitted, and a next data burst arrival time for the buffer indicating a time when a next burst of data will arrive. The operations further include generating a queuing latency aware buffer status report (BSR) based at least on the determined latency information and transmitting the queuing latency aware BSR to an access point.

This Summary is provided merely for purposes of illustrating some embodiments to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1:
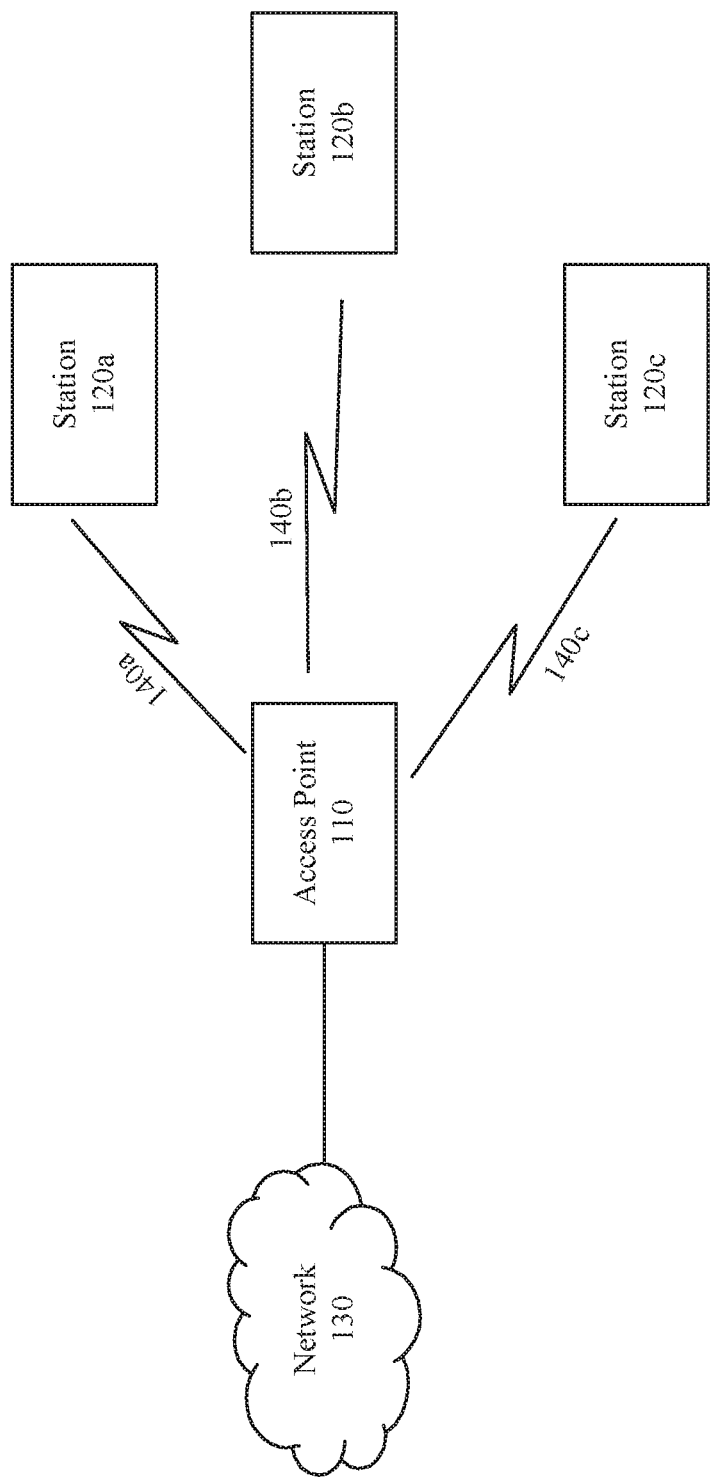
FIG. 1 illustrates an example system implementing a queuing latency aware BSR, according to some embodiments of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some embodiments of this disclosure include apparatuses and methods for implementing a queuing latency aware buffer status report (BSR). The queuing latency aware BSR of the embodiments of this disclosure includes information that assists the access point (AP) to improve its UL MU scheduling by, for example, better utilizing channel resources and better serving the stations (STA) to minimize the STAs' traffic latency.

According to some embodiments, the queuing latency aware BSR can be implemented with communication techniques compatible with Institute of Electrical and Electronics Engineers (IEEE) 802.11 standards (such as, but not limited to IEEE 802.11ac, IEEE 802.11ax, IEEE 802.11bc, IEEE 802.11bd, IEEE 802.11be, etc.). For example, the queuing latency aware BSR can be used within a wireless local area Network (WLAN).

According to some embodiments, the queuing latency aware BSR, which are transmitted by a STA to an AP, can include a status of a buffer (e.g., a buffer size) of the STA. The queuing latency aware BSR can be transmitted using a quality of service (QoS) control field of a frame. The QoS control field can provide the buffer status for a specific traffic identifier (TID), in some examples. Additionally or alternatively, the queuing latency aware BSR can be transmitted using an A-control field of a frame. For example, the A-control field can provide the buffer status for one or multiple access categories. According to some embodiments, access categories (AC) can include video category, voice category, best effort category, and background category. In some examples, one access category can have two TIDs. According to some embodiments, the QoS control field or the A-control field are part of medium access control (MAC) header of one or more MAC frames and can be sent in data frames or QoS null frames.

According to some embodiments, the queuing latency aware BSR transmitted by the STA includes more information in addition to a buffer size of the STA—e.g., a number of data bytes queued in one or more buffers of the STA. For example, the queuing latency aware BSR can include latency information and/or QoS requirement(s) associated with the buffer. In these embodiments, even though the AP can have the overall QoS requirements for a flow, the AP will also have latency information and/or QoS requirement(s) associated with the STA's buffer(s).

In some examples, the queuing latency aware BSR can include information in addition to a reported buffer size of buffered data. For example, the queuing latency aware BSR can include a queuing time. The queuing time can indicate how long the reported buffered data has been queued. In some embodiments, the queuing time indicates the average time the buffered data has been queued. In one example, the average time includes the queuing time for the data queued at the buffer averaged over the amount of data queued at the buffer. The amount of data can include the number of data bytes queued in the buffer, the number of data frames queued in the buffer, the number of data packets queued in the buffer, or some other measure of data queued. Additionally or alternatively, the queuing time can include a maximum queuing time. For example, the maximum queuing time can include the queuing time for a data byte (a data frame, or a data packet) that has been in the buffer the longest.

Additionally or alternatively, the queuing latency aware BSR can include time-to-live information. The time-to-live information can indicate how long the reported buffered data has until it will be removed from the buffer if not transmitted. In other words, the time-to-live information can indicate the deadline when the reported buffered data has to be transmitted out of the buffer. The time-to-live information associated with the reported buffered data can be related to the QoS requirement associated with that buffered data. In some examples, the time-to-live information can include maximum time-to-live information over the buffered data bytes. Additionally or alternatively, the time-to-live information can include minimum time-to-live information over the buffered data bytes. In some embodiments, the time-to-live information can include average time-to-live information averaged over the buffered data bytes.

The queuing latency aware BSR can also include a next data burst arrival time for the reported buffer. The next data burst arrival time indicates when the next burst of data will arrive for the reported buffer. By knowing the next data burst arrival time, the AP can know how and when to schedule the next transmission for that buffer.

According to some embodiments, the STA can send the queuing latency aware BSR to an access point (AP) to report some latency information associated with the buffered data and/or the buffer to the AP. In some example, the queuing latency aware BSR can include the number of buffered bytes. Additionally or alternatively, the number of buffered bytes can be reported by the STA separately from the queuing latency aware BSR. In one example, the queuing latency aware BSR can be transmitted using an A-control field of a MAC header of a MAC frame. The MAC frame can be a data frame or a QoS null frame. The number of buffered bytes associated with the queuing latency aware BSR can also be reported by the STA using the same or different A-control field. Alternatively, the number of buffered bytes associated with the queuing latency aware BSR can be reported using the QoS control field of the same or different MAC header.

According to some embodiments, the STA can send the queuing latency aware BSR to the AP periodically. For example, a time period can be defined for the STA (e.g., by STA itself or by the AP). The STA can send the queuing latency aware BSR based on the defined time period. Additionally or alternatively, one or more thresholds can be defined for the STA (e.g., by STA itself or by the AP) for transmitting the queuing latency aware BSR. For example, if the number of bytes queued in a buffer exceeds a defined threshold, then the STA can send the queuing latency aware BSR. Or if the queuing time exceeds another defined threshold, then the STA can transmit the queuing latency aware BSR. In some embodiments, the STA can transmit the queuing latency aware BSR in real time or approximately real time. However, the embodiments of this disclosure are not limited to these examples and the STA can use other method for initiating the generation and transmission of the queuing latency aware BSR.

According to some embodiments, the AP is configured to apply some rules for the STAs reporting the queuing latency aware BSR. For example, the AP can indicate that each STA will send a predefined maximum number (N) of queuing latency aware BSRs within a predefined report window (a time window) (T). Additionally or alternatively, the AP can indicate that the reported time-to-live cannot be smaller than a predefined threshold (M). The AP can notify the STA of the values of the predefined maximum number (N) of queuing latency aware BSRs, the predefined report window (T), and the time-to-live predefined threshold (M) using different frames. For example, the AP can use a Beacon frame to communicate these predefined values to the STAs. Additionally or alternatively, the AP can use an association response to communicate these predefined values to the STAs. In some example, the AP can use the probe response frames to communicate these predefined values to the STAs.

In additional to or instead of these frames, the AP can use other information element(s) (IE) to communicate these predefined values to the STAs. Or, a new management frame type can be defined (e.g., low latency BSR parameter frame) to communicate these predefined values to the STAs.

FIG. 1 illustrates an example system 100 implementing a queuing latency aware BSR, according to some embodiments of the disclosure. Example system 100 is provided for the purpose of illustration only and does not limit the disclosed embodiments. System 100 may include, but is not limited to, access point (AP) 110, stations (STA) 120, and network 130. Stations 120a-120c may include, but are not limited to, Wireless Local Area Network (WLAN) stations such as wireless communication devices, smart phones, laptops, desktops, tablets, personal assistants, monitors, televisions, wearable devices, and the like. Access point (AP) 110 may include but is not limited to WLAN electronic devices such as a wireless router, a wearable device (e.g., a smart watch), a wireless communication device (e.g., a smart phone), or a combination thereof. Network 130 may be the Internet and/or a WLAN. Station 120's communications are shown as wireless communications 140. The communication between AP 110 and STA 120 can take place using wireless communications 140a-140c. The wireless communications 140a-140c can be based on a wide variety of wireless communication techniques. These techniques can include, but are not limited to, techniques based on IEEE 802.11 (such as, but not limited to, IEEE 802.11ac, IEEE 802.11ax, IEEE 802.11bc, IEEE 802.11bd, IEEE 802.11be, IEEE 802.11v, etc.)

According to some embodiments, AP 110 and STAs 120 are configured to implement the queuing latency aware BSR. AP 110 is configured to communicate to STAs 120 that AP 110 is capable of using and implementing the queuing latency aware BSR. Also, AP 110 is configured to communicate to STAs 120 parameters and/or rules associated with the queuing latency aware BSR. For example, AP 110 can use a Beacon frame, an association response, a probe response frame, an information element (IE), a new management frame, and/or other frames to send the parameters and/or rules associated with the queuing latency aware BSR to STAs 120. In one example, the parameters and/or rules associated with the queuing latency aware BSR includes the values of the predefined maximum number (N) of queuing latency aware BSRs, the predefined report window (T), and the time-to-live predefined threshold (M) using different frames.

According to some embodiments, the Beacon frame is a frame transmitted by AP 110 to communicate one or more parameters associated with AP 110 and/or one or more parameters associated with the network associated with (e.g., managed by) AP 110. AP 110 can use the Beacon frame to indicate that AP 110 can use queuing latency aware BSR and/or to transmit the parameters and/or rules associated with the queuing latency aware BSR.

In another example, AP 110 may use an association response to transmit the parameters and/or rules associated with the queuing latency aware BSR. A STA, for example STA 120a, sends an association request to AP 110 to associate with AP 110. In response, AP 110 sends an association response to STA 120a. The association response can include an indication that AP 110 can use queuing latency aware BSR and/or the parameters and/or rules associated with the queuing latency aware BSR.

In another example, AP 110 may use one or more probe response frames to transmit the parameters and/or rules associated with the queuing latency aware BSR. A STA, for example STA 120a, sends one or more probe request frames to AP 110. For example, STA 120a uses the probe request frame to inquire one or more parameters associated with AP 110 and/or the network managed by AP 110. STA 120a can use information received in response to its probe request frame to decide to associate with AP 110 (e.g., join the network managed by AP 110). In response, AP 110 sends one or more probe response frames to STA 120a. The probe response frame(s) can include an indication that AP 110 can use queuing latency aware BSR and/or the parameters and/or rules associated with the queuing latency aware BSR.

Additionally or alternatively, AP 110 may use other information element(s) (IE) or a new management frame (e.g., low latency BSR parameter frame) to communicate to STAs 120 that AP 110 can use queuing latency aware BSR and/or the parameters and/or rules associated with the queuing latency aware BSR. In some examples, the IE can include and IE ID and the parameters and/or rules associated with the queuing latency aware BSR.

According to some examples, an STA, for example STA 120a is configured to communicate to AP 110 that STA 120a is capable of generating and transmitting the queuing latency aware BSR. For example, STA 120a can use a capability subfield in the QoS control field of the MAC header of a frame and/or a capability subfield in the A-control field of the MAC header to communicate to AP 110 that STA 120a is capable of generating and transmitting the queuing latency aware BSR. However, the embodiments of this disclosure are not limited to this example and the capability subfield can be located at other parts of the MAC header.

Additionally or alternatively, STA 120a can generate and transmit the queuing latency aware BSR to AP 110. For example, STA 120a can transmit the queuing latency aware BSR using the A-control field of the MAC header of a frame. The frame can include a data frame and/or a QoS null frame. The queuing latency aware BSR can include latency information and/or QoS requirement(s) associated with the data queued at one or more buffers of STA 120a. The data is queued at the one or more buffers of STA 120a to be transmitted to AP 110 and/or other STAs 120. In some embodiments, the queuing latency aware BSR can include the buffer size. Additionally or alternatively, the buffer size can be transmitted separately from the queuing latency aware BSR. In some of the embodiments of this disclosure, the buffer size is discussed as the number of data bytes queued in a buffer. However, the embodiments of this disclosure are not limited to this example and the buffer size can include other measures, for example, the number of data packets in a buffer, the number of data frames in the buffer, or the like.

According to some embodiments, the queuing latency aware BSR transmitted by STA 120a can include a queuing time associated with the data in the buffer. The queuing time can indicate how long the reported buffered data has been queued in the buffer of STA 120a. In some embodiments, the queuing time indicates the average queuing time. Additionally or alternatively, the queuing time can include a maximum queuing time. In one example, the average time includes the queuing time for the data queued at the buffer averaged over the amount of data queued at the buffer. The amount of data can include the number of data bytes queued in the buffer, the number of data frames queued in the buffer, the number of data packets queued in the buffer, or some other measure of data queued. Additionally or alternatively, the maximum queuing time can include the queuing time for a data byte (a data frame, or a data packet) that has been in the buffer the longest. The queuing latency aware BSR transmitted by STA 120a can include time-to-live information associated with the data in the buffer. The time-to-live information can indicate how long the reported buffered data has until it will be removed from the buffer if not transmitted. In some examples, the time-to-live information can include maximum time-to-live information. Additionally or alternatively, the time-to-live information can include minimum time-to-live information. In some embodiments, the time-to-live information can include average time-to-live information. The queuing latency aware BSR transmitted by STA 120*a* can also include a next data burst arrival time associated with the buffer. The next data burst arrival time indicates when the next burst of data will arrive at the reported buffer.

In addition to the queuing latency aware BSR, STAs 120 can transmit one or more reports that are associated with a data flow (e.g., traffic interval of the flow, traffic load of the flow, latency requirement of the flow). The report(s) associated with the data flow can include traffic characteristics or QoS requirement(s) associated with the data flow. On the other hand, the queuing latency aware BSRs include latency and/or QoS requirements specific to a currently reported buffer. The queuing latency aware BSRs are associated with the buffer and/or queued data of the buffer that are being reported to, for example, AP 110.

According to some embodiments, after receiving the queuing latency aware BSR(s) from one or more STAs 120, AP 110 can be configured to schedule the uplink transmission for STAs 120 based at least on the received queuing latency aware BSR(s). In other words, AP 110 is configured to schedule the uplink transmission for STAs 120 based on the buffer size (e.g., amount of data queued in the buffer) and the latency information (and/or QoS requirements) associated with the reported buffered data (and/or the reported buffer), according to some embodiments. AP 110 can communicate the schedule uplink transmissions to STAs 120. Therefore, the network efficiency can be improved by better utilizing the channel resources and better serving STAs 120 to minimize their traffic latency. For example, the embodiments of this disclosure can consider the requirements of low latency applications running on STAs 120 to improve traffic latency and channel utilization. By generating, reporting, and using the queuing latency aware BSR, the QoS requirements of the application running on STAs 120 is considered by, for example, AP 110 in scheduling UL transmissions of STAs 120.

Figure 2:
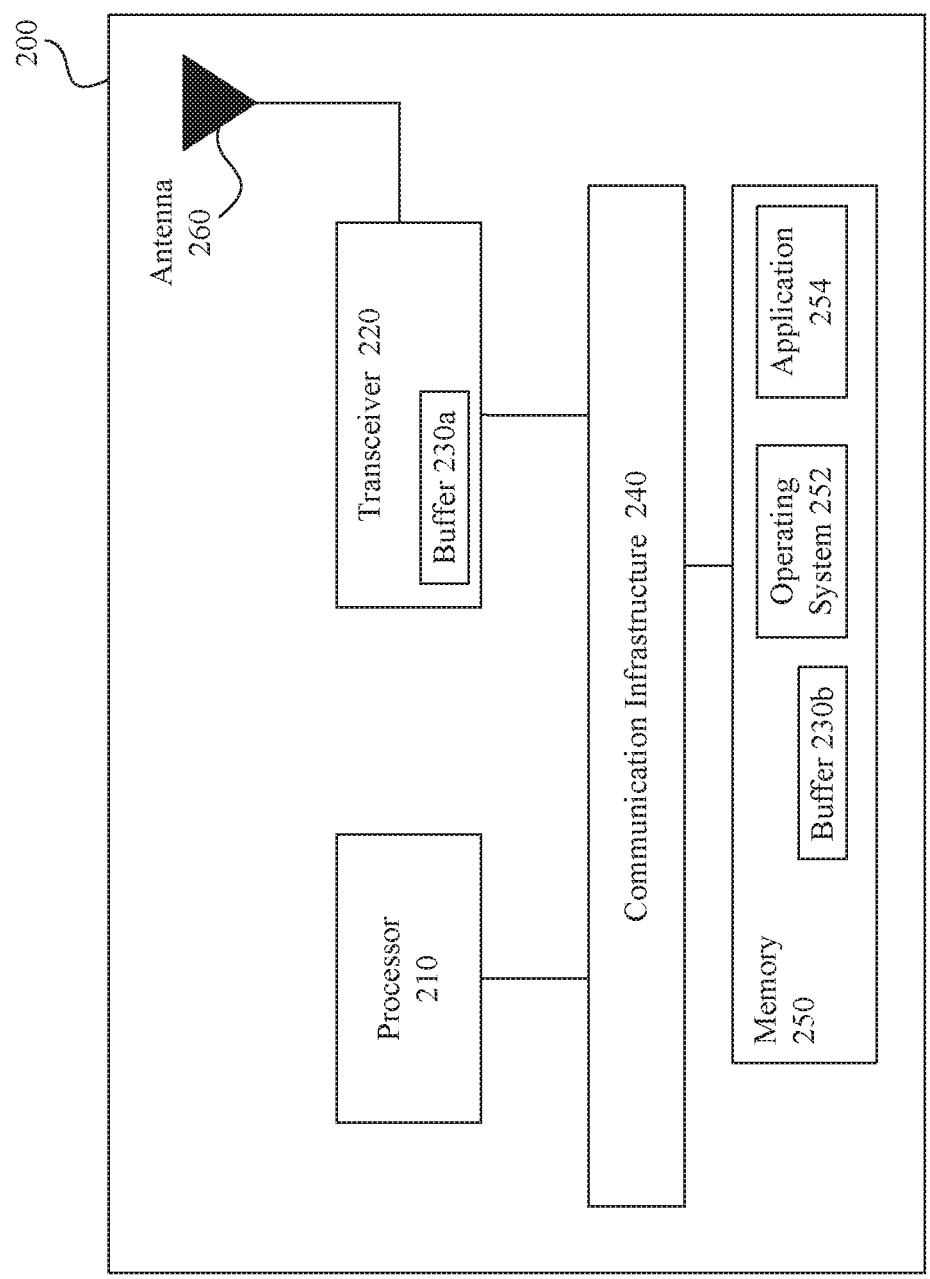
FIG. 2 illustrates a block diagram of an example wireless system of an electronic device implementing the queuing latency aware BSR, according to some embodiments of the disclosure.

FIG. 2 illustrates a block diagram of an example wireless system 200 of an electronic device implementing the queuing latency aware BSR, according to some embodiments of the disclosure. System 200 may be any of the electronic devices (e.g., AP 110, STA 120) of system 100. System 200 includes processor 210, transceiver 220, buffer(s) 230*a* and 230*b*, communication infrastructure 240, memory 250, operating system 252, application 254, and antenna 260. Illustrated systems are provided as exemplary parts of wireless system 200, and system 200 can include other circuit(s) and subsystem(s). Also, although the systems of wireless system 200 are illustrated as separate components, the embodiments of this disclosure can include any combination of these, less, or more components.

Memory 250 may include random access memory (RAM) and/or cache, and may include control logic (e.g., computer software) and/or data. Memory 250 may include other storage devices or memory such as, but not limited to, a hard disk drive and/or a removable storage device/unit. According to some examples, operating system 252 can be stored in memory 250. Operating system 252 can manage transfer of data from memory 250 and/or one or more applications 254 to processor 210 and/or transceiver 220. In some examples, operating system 252 maintains one or more network protocol stacks (e.g., Internet protocol stack, cellular protocol stack, and the like) that can include a number of logical layers. At corresponding layers of the protocol stack, operating system 252 includes control mechanism and data structures to perform the functions associated with that layer.

According to some examples, application 254 can be stored in memory 250. Application 254 can include applications (e.g., user applications) used by wireless system 200 and/or a user of wireless system 200. The applications in application 254 can include applications such as, but not limited to, Siri™, FaceTime™, radio streaming, video streaming, remote control, and/or other user applications.

Alternatively or in addition to the operating system, system 200 can include communication infrastructure 240. Communication infrastructure 240 provides communication between, for example, processor 210, transceiver 220, and memory 250. In some implementations, communication infrastructure 240 may be a bus. Processor 210 together with instructions stored in memory 250 perform operations enabling wireless system 200 of system 100 to implement the queuing latency aware BSR as described herein. Additionally or alternatively, transceiver 220 performs operations enabling wireless system 200 of system 100 to implement the queuing latency aware BSR as described herein.

Transceiver 220 transmits and receives communications signals that support the queuing latency aware BSR, according to some embodiments, and may be coupled to antenna 260. Antenna 260 may include one or more antennas that may be the same or different types. Transceiver 220 allows system 200 to communicate with other devices that may be wired and/or wireless. Transceiver 220 can include processors, controllers, radios, sockets, plugs, buffers, and like circuits/devices used for connecting to and communication on networks. According to some examples, transceiver 220 includes one or more circuits to connect to and communicate on wired and/or wireless networks. Transceiver 220 can include a cellular subsystem, a WLAN subsystem, and/or a Bluetooth™ subsystem, each including its own radio transceiver and protocol(s) as will be understood by those skilled arts based on the discussion provided herein. In some implementations, transceiver 220 can include more or fewer systems for communicating with other devices.

Cellular subsystem (not shown) can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), and the like. Bluetooth™ subsystem (not shown) can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. WLAN subsystem (not shown) can include one or more circuits (including a WLAN transceiver) to enable connection(s) and communication over WLAN networks such as, but not limited to, networks based on standards described in IEEE 802.11 (such as, but not limited to, IEEE 802.11ac, IEEE 802.11ax, IEEE 802.11bc, IEEE 802.11bd, IEEE 802.11be, etc.).

According to some embodiments, processor 210, alone or in combination with memory 250, and/or transceiver 220, implements the queuing latency aware BSR. For example, system 200 is configured to generate and transmit the queuing latency aware BSR associated with a buffer (e.g., buffer 230*a* and/or buffer 230*b*) of transceiver 220. In other words, the queuing latency aware BSR can include latency information for data queued at buffer 230*a* at transceiver 220 to be transmitted from system 200. Although some embodiments of this disclosure discuss the queuing latency aware BSR in accordance with a buffer at transceiver 220 (e.g., buffer 230*a*), the buffer can be located at other parts of system 200, such as a portion of memory 250 (e.g., buffer 230*b*).

According to some examples, processor 210, alone or in combination with transceiver 220 and/or memory 205 can determine the buffer size (e.g., the number of data bytes queued in the buffer (e.g., buffer 230*a* and/or buffer 230*b*)). Additionally or alternatively, processor 210, alone or in combination with transceiver 220 and/or memory 205 can determine latency information associated with the buffered data. The latency information can include, but are not limited to, some or all of the queuing time, the time-to-live information, and the next data burst arrival time, as discussed above. After determining the latency information, processor 210, alone or in combination with transceiver 220 and/or memory 205 can generate the queuing latency aware BSR (based at least on the latency information) and can transmit the queuing latency aware BSR.

According to some examples, processor 210, alone or in combination with transceiver 220 and/or memory 205 can receive rules and/or parameters associated with the queuing latency aware BSR from, for example, AP 110. Processor 210, alone or in combination with transceiver 220 and/or memory 205, can determine, generate, and transmit the queuing latency aware BSR based on the received rules and/or parameters.

Also, processor 210, alone or in combination with transceiver 220 and/or memory 205, can receive UL MU transmission schedule from, for example, AP 110 and transmit the buffered data based on the received UL MU transmission schedule.

Figure 3A:
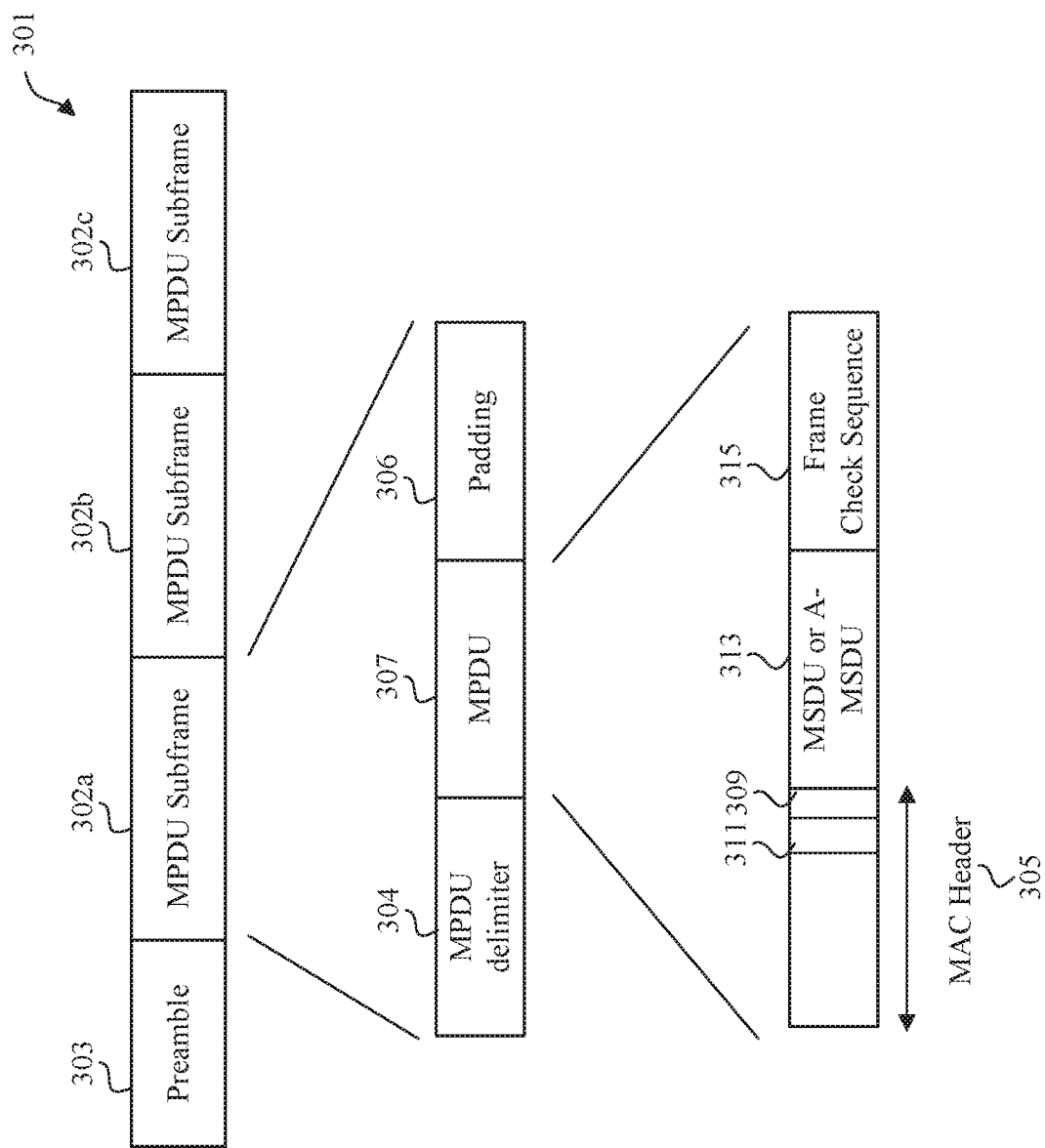
FIG. 3A illustrates an example frame format to communicate the queuing latency aware BSR, according to some embodiments of the disclosure.

FIG. 3A illustrates an example frame format, which can be communicated between STA 120*a* and AP 110 to communicate the queuing latency aware BSR, according to some embodiments of the disclosure. For example, FIG. 3A illustrates an exemplary format of physical layer convergence protocol data unit (PPDU) 301. PPDU 301 can include packets and/or frames communicated between a station (e.g., STA 120*a*) and an access point (e.g., AP 110) or other packets and/or frames discussed herein, according to some examples. PPDU 301 includes one or more MAC protocol data unit (MPDU) subframes 302*a-c* and preamble 303. Preamble 303 can include a physical layer preamble and/or physical layer header. Preamble 303 can include information used for carrier acquisition, synchronization, channel estimation, communicating frame specific parameters (e.g., coding rate, frame length, etc.), or other purposes.

MPDU subframe 302 can include fields such as, but not limited to, MPDU delimiter 304, MPDU 307, and padding 306. MPDU delimiter 304 can include information on MPDU length, cyclic redundancy checks (CRC), and/or a unique pattern. Padding 306 can include frame check sequence (FCS) for error-detection and/or additional padding (e.g., 0 to 3 bytes) to compensate for different lengths of different MPDUs. MPDU 307 can include media access control (MAC) header 305, frame body (e.g., MAC service data unit (MSDU) and/or aggregated MSDU (A-MDSU)) 313, and frame check sequence (FCS) 315, according to some embodiments. If MPDU 307 includes A-MSDU 313, A-MSDU 313 can include one or more A-MSDU subframes, where each A-MSDU subframe can include an A-MSDU subframe header, an MSDU, and a padding, according to some embodiments. According to some examples, the packets and/or frames communicated between STA 120*a* and AP 110 are encoded within one or more MPDUs 307.

In some examples MAC header 305 can include fields such as, but not limited to, frame control, duration field, address(es) (e.g., one or more source addresses, one or more destination addresses, etc.), sequence control, quality of service (QoS) control, and HT control as understood by a person of ordinary skill in art. In embodiments, one or more fields of the MAC header 305 can be used to communicate the queuing latency BSR. For example, MAC header 305 can include HT control field 309 that are discussed in more detail with respect to FIG. 3B.

MAC header 305 can also include QoS control field 311. QoS control field 311 can include a field indicating the traffic identifier (TID). In a non-limiting example, the TID field of QoS control field 311 can include four bits. The TID can indicate the stream of frames to which MSDU 313 belongs. According to some embodiments, an electronic device (e.g., STA 120*a*) can transmit multiple streams of frames with different QoS requirements. The TID is used to differentiate between the multiple streams of frames. QoS field 311 can also include a queue size subfield indicating the buffer size (e.g., the number of bytes queued in a buffer.)

Figure 3B:
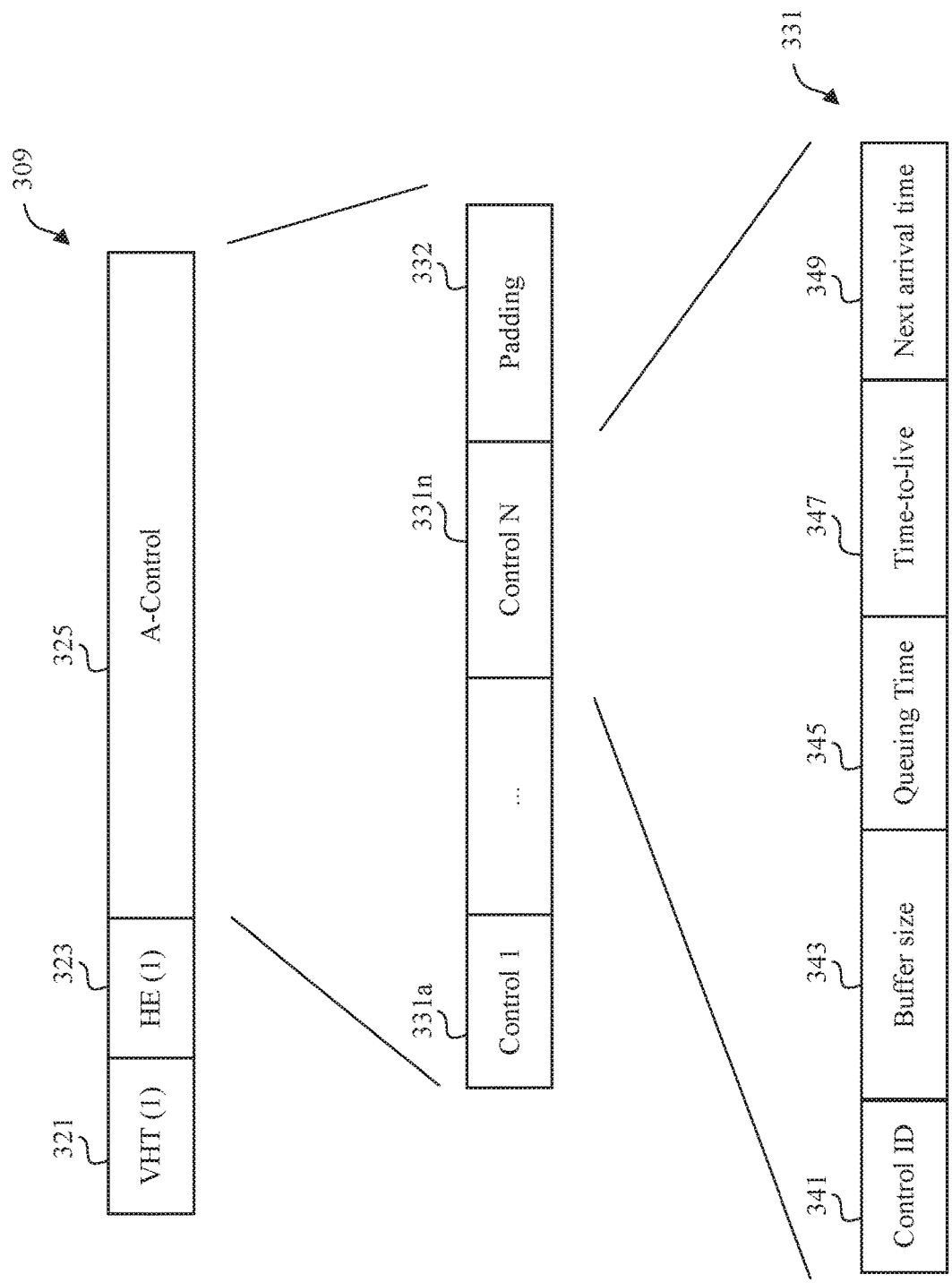
FIG. 3B illustrates an example HT control field format to communicate the queuing latency aware BSR, according to some embodiments of the disclosure.

FIG. 3B illustrates an example HT control field format, which can be communicated between STA 120*a* and AP 110 to communicate the queuing latency aware BSR, according to some embodiments of the disclosure. For example, FIG. 3B illustrates HT control field 309 of MAC header 305. According to some embodiments, HT control field includes two bits VHT (Very High Throughput) 321 and HE (High Efficiency) 323. Depending on the values of these two bits, a receiver device that receives HT control field 309 (e.g., AP 110) can determine the purpose and format of HT control field 309 and decode HT control field 309 accordingly. For example, if the value of VHT 321 bit is "0", HT control field 309 is an HT (High Throughput) variant. If the value of VHT 321 bit is "1" and the value of HE 323 bit is "0", HT control field 309 is a VHT (Very High Throughput) variant. If the value of VHT 321 bit is "1" and the value of HE 323 bit is "1", HT control field 309 is an HE (High Efficiency) variant.

According to some embodiments, when a receiver device (e.g., AP 110) receives the frame having MAC header 305 including HT control field 309 with the value of VHT 321 bit being "1" and the value of HE 323 bit being "1", the receiver device knows that the rest of HT control field 309 is A-control field 325. Therefore, the receiver device can decode A-control field 325 accordingly. In some examples, A-control field 325 can include 30 bits. But the embodiments of this disclosure are not limited to this example.

In some embodiments, A-control field 325 can include different control subfields 331*a*-331*n* and padding field 332. In some examples, control subfields 331*a*-331*n* can each have variable sizes. Padding subfield 332 can have 0 or more bits. STA 120*a* can be configured to use one or more control subfields 331 to communicate the queuing latency aware BSR to AP 110, according to some embodiments.

For example, a control subfield 331 of A-control field 325 can include different parts for communicating the queuing latency aware BSR. According to some examples, control subfield 331 for communication the queuing latency aware BSR can include one or more of the following parts: control identifier (ID) 341, buffer size 343, queuing time 345, time-to-live 374, and next arrival time 349.

According to some embodiments, control ID 341 is set to a value not used for other purposes of other control subfields 331. For example, a unique control ID 341 signals to a receiver device (e.g., AP 110) that the received control subfield 331 is for communicating the queuing latency aware BSR. Buffer size 343 indicates the buffer size (queue size), for example, the number of bytes queued in a buffer that control subfield 331 is reporting on. In some examples, buffer size 343 can be eliminated from control subfield 331 of A-control field 325 of MAC header 305. Instead, buffer size 343 can be reported using QoS control field 311 of the same MAC header 305 that includes control field 331 of A-control field 325.

Queuing time 345 can include the queuing time that can indicate how long the reported buffered data has been queued in the buffer of STA 120a. In some embodiments, the queuing time indicates an average queuing time. Additionally or alternatively, the queuing time can include a maximum queuing time. In one example, the average time includes the queuing time for the data queued at the buffer averaged over the amount of data queued at the buffer. The amount of data can include the number of data bytes queued in the buffer, the number of data frames queued in the buffer, the number of data packets queued in the buffer, or some other measure of data queued. Additionally or alternatively, the maximum queuing time can include the queuing time for a data byte (a data frame, or a data packet) that has been in the buffer the longest.

Time-to-live 347 can include the time-to-live information that can indicate how long the reported buffered data has until it will be removed from the buffer if not transmitted. In some examples, the time-to-live information can include maximum time-to-live information. Additionally or alternatively, the time-to-live information can include minimum time-to-live information. In some embodiments, the time-to-live information can include average time-to-live information. Next arrival time 349 can include a next data burst arrival time associated with the reported buffer. The next data burst arrival time indicates when the next burst of data will arrive.

It is noted that although control subfield 331 for communicating the queuing latency aware BSR is discussed with respect to the control identifier (ID) 341, buffer size 343, queuing time 345, time-to-live 374, and next arrival time 349, control subfield 331 can include less or additional parts/subfields.

Additionally or alternatively, control subfield 331 of A-control field 325 can include a capability subfield (not shown) that can indicates that the STA (e.g., STA 120a) is capable of determining and generating the queuing latency aware BSR.

A-control field 325 of HT control field 309 of MAC header 305 used for communicating queuing latency aware BSR can be part of a data frame or a QoS null frame. The QoS null frame can be a frame that does not include data payload (e.g., frame body). According to some embodiments, the QoS null frame can be used by STA 120a to report the buffer status (e.g., the number of data bytes queued in the buffer) and/or to report the queuing latency aware BSR. In some examples, the QoS null frame can be used by STA 120a to communicate to AP 110 the QoS requirements of STA 120a and/or any changes in QoS requirements of STA 120a.

Figure 4:
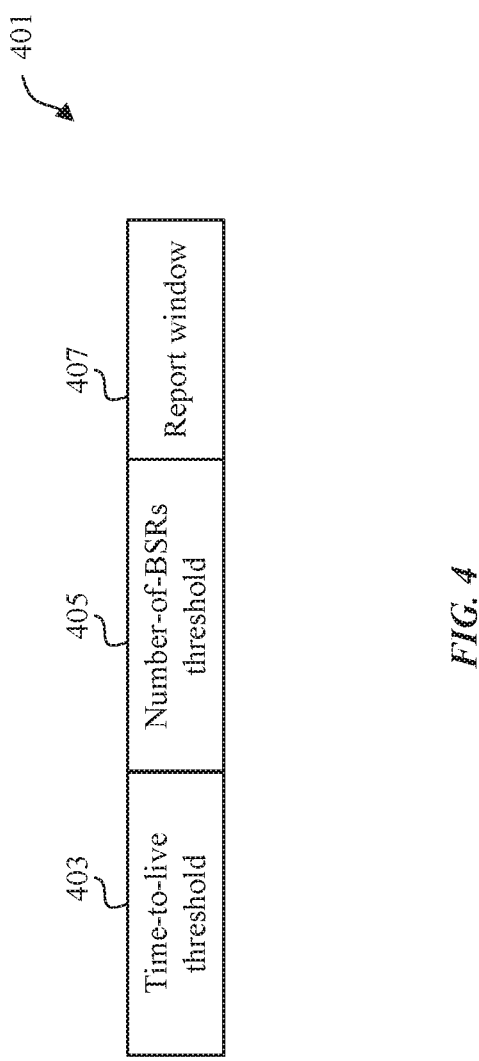
FIG. 4 illustrates an example frame field format to communicate parameters and/or rules associated with the queuing latency aware BSR, according to some embodiments of the disclosure.

FIG. 4 illustrates an example frame field format, which can be communicated between AP 110 and STA 120a to communicate parameters and/or rules associated with the queuing latency aware BSR, according to some embodiments of the disclosure. In some embodiments, frame fields 401 can be used by AP 110 and STA 120a to communicate parameters and/or rules associated with the queuing latency aware BSR. In some examples, frame fields 401 can include or be part of a Beacon frame, an association response, a probe response frame, an information element (IE), a new management frame, and/or other frames to send the parameters and/or rules associated with the queuing latency aware BSR.

According to some embodiments, frame fields 401 can be part of a Beacon frame, which is a frame transmitted by AP 110 to one or more STAs 120 to communicate one or more parameters associated with AP 110 and/or one or more parameters associated with the network associated with (e.g., managed by) AP 110. In another example, frame fields 401 can be part of an association response. A STA, for example STA 120a, sends an association request to AP 110 to associate with AP 110. In response, AP 110 sends an association response to STA 120a. The association response can include frame fields 401.

In another example, frame fields 401 may be part of one or more probe response frames. A STA, for example STA 120a, sends one or more probe request frames to AP 110. For example, STA 120a uses the probe request frame to inquire one or more parameters associated with AP 110 and/or the network managed by AP 110. STA 120a can use information received in response to its probe request frame to decide to associate with AP 110 (e.g., join the network managed by AP 110). In response, AP 110 sends one or more probe response frames to STA 120a. The probe response frame(s) can include frame fields 401.

Additionally or alternatively, frame fields 401 may be part of other information element(s) (IE) or a new management frame (e.g., low latency BSR parameter frame).

In one example, frame fields 401 can include one or more of the following fields: time-to-live threshold 403, number-of-BSRs threshold 405, and report window 407. For example, number-of-BSRs threshold 405 can include a predefined maximum number (N) of queuing latency aware BSRs that a STA (e.g., STA 120a) can transmit within a predefined time window (T) indicated by report window 407. Also, time-to-live threshold 403 can include a minimum time-to-live threshold (M) where the time-to-live values reported by a STA (e.g., STA 120a) will not be less than time-to-live threshold 403.

Additionally or alternatively, frame fields 401 can include a capability subfield (not shown) that can indicate that AP 110 is capable of receiving and using the queuing latency aware BSR.

It is noted that although frame fields 401 for communicating parameters and/or rules associated with the queuing latency aware BSR is discussed with respect to fields 403, 405, and 407, frame fields 401 can include less or additional fields.

Figure 5A:
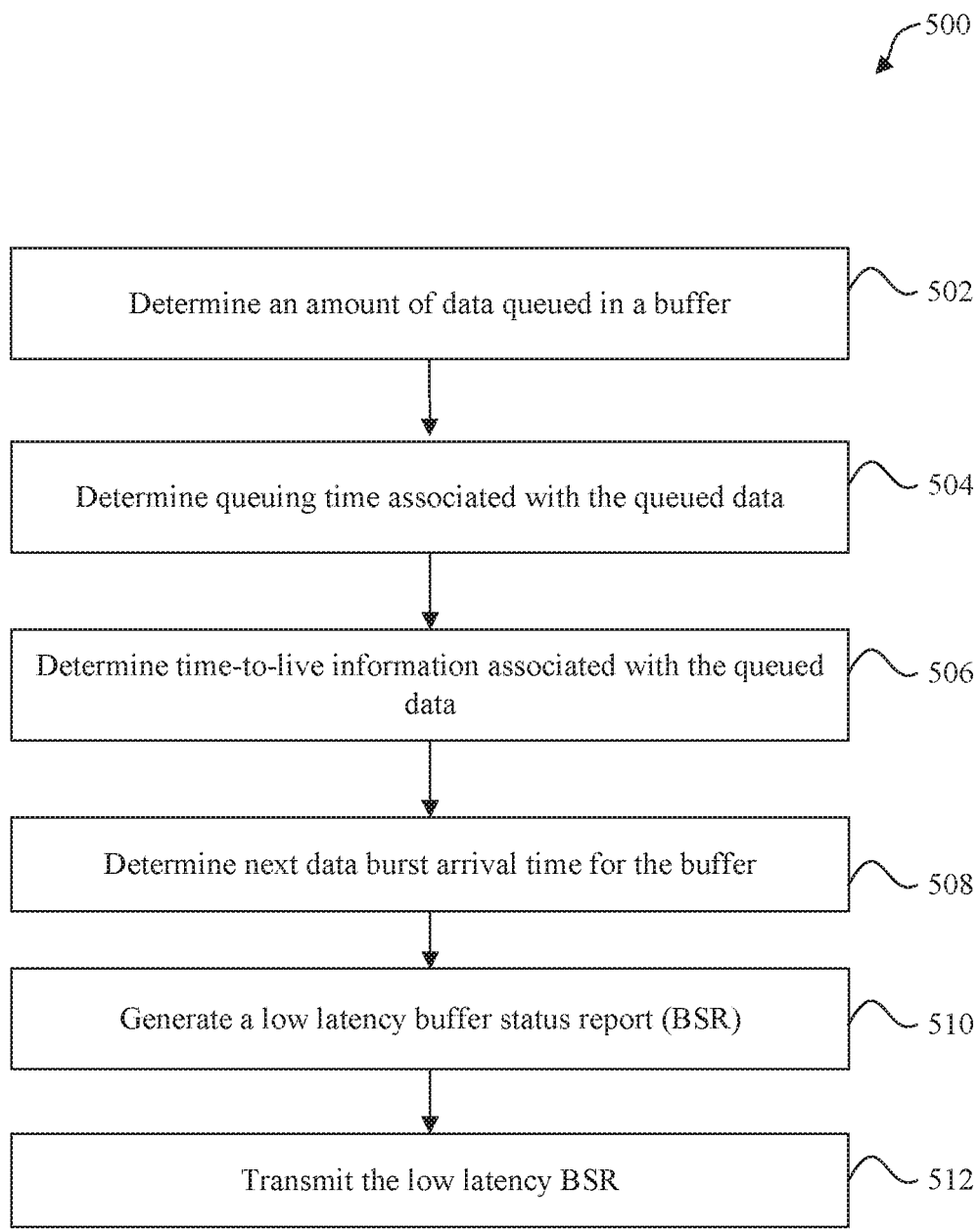
FIG. 5A illustrates an example method for a wireless system supporting queuing latency aware BSR, according to some embodiments of the disclosure.

FIG. 5A illustrates an example method 500 for a wireless system supporting queuing latency aware BSR, according to some embodiments of the disclosure. As a convenience and not a limitation, FIG. 5 may be described with regard to elements of FIGS. 1-4. Method 500 may represent the operation of station (STA) 120a of FIG. 1 implementing queuing latency aware BSR. Method 500 may also be performed by system 200 of FIG. 2 and/or computer system 600 of FIG. 6. But method 500 is not limited to the specific embodiments depicted in those figures and other systems may be used to perform the method as will be understood by those skilled in the art. It is to be appreciated that not all operations may be needed, and the operations may not be performed in the same order as shown in FIG. 5A.

At 502, an amount of data queued in a buffer for transmission over a wireless network is determined. For example, STA 120a determines the amount of data queued in a buffer for transmission over the wireless network. The amount of data can include the number of data bytes queued in the buffer, the number of data frames queued in the buffer, the number of data packets queued in the buffer, or some other measure of data queued, for example. STA 120a is configured to transmit the data to AP 110 and/or over the wireless network managed by AP 110.

In some embodiments, before determining the amount of the queued data, STA 120a may receive from, for example, AP 110, capability information indicating that AP 110 is capable of receiving and using queuing latency aware buffer status report (BSR). Additionally or alternatively, STA 120a may receive from AP 110 parameters and/or rules associated with the queuing latency aware BSR.

According to some embodiments, after determining the amount of data queued, STA 120a can determine latency information associated with the queued data and can generate a queuing latency aware BSR based at least on the determined latency information. Determining the latency information associated with the queued data can include one or more of determining queuing time (e.g., amount of time the data has been queued for transmit), determining time-to-live information of the queued data, and determining next data burst arrival time at the buffer storing the queued data.

For example, at 504, STA 120a determines the queuing time associated with the queued data. The queuing time can be a maximum queuing time associated with the queued data or an average queuing time associated with the queued data. At 506, STA 120a determines the time-to-live information associated with the queued data indicating a deadline when the queued data is to be transmitted. And at 508, STA 120a determines the next data burst arrival time for the buffer indicating a time when a next burst of data will arrive.

At 510, STA 120a generates the queuing latency aware buffer status report (BSR) based at least on the determined latency information. In some examples, the queuing latency aware BSR includes one or more of a capability subfield, a control identifier (ID) associated with the queuing latency aware BSR, the number of bytes, frames, or packets of the queued data, the queuing time associated with the queued data, the time-to-live information associated with the queued data, and the next data burst arrival time for the buffer.

At 512, STA 120a transmits the queuing latency aware BSR to, for example, an access point of the wireless network (e.g., AP 110). STA 120a can transmit the queuing latency aware BSR using a frame as discussed with respect to FIGS. 3A and 3B. For example, the queuing latency aware BSR can be inserted into the MAC header of an MPDU subframe of a PPDU.

According to some embodiments, after transmitting the queuing latency aware BSR, STA 120a may receive scheduling information from, for example, AP 110. The scheduling information can indicate time periods when STA 120a may transmits its uplink data. AP 110 can determine the scheduling information based on the queuing latency aware BSR(s) received from one or more STAs. By knowing QoS requirements and/or latency information associated with the buffer(s) and the queued data in the STAs, AP 110 is configured to better serve the STAs to minimize STAs' traffic latency. Also, the STAs can better utilize the channel resources.

Figure 5B:
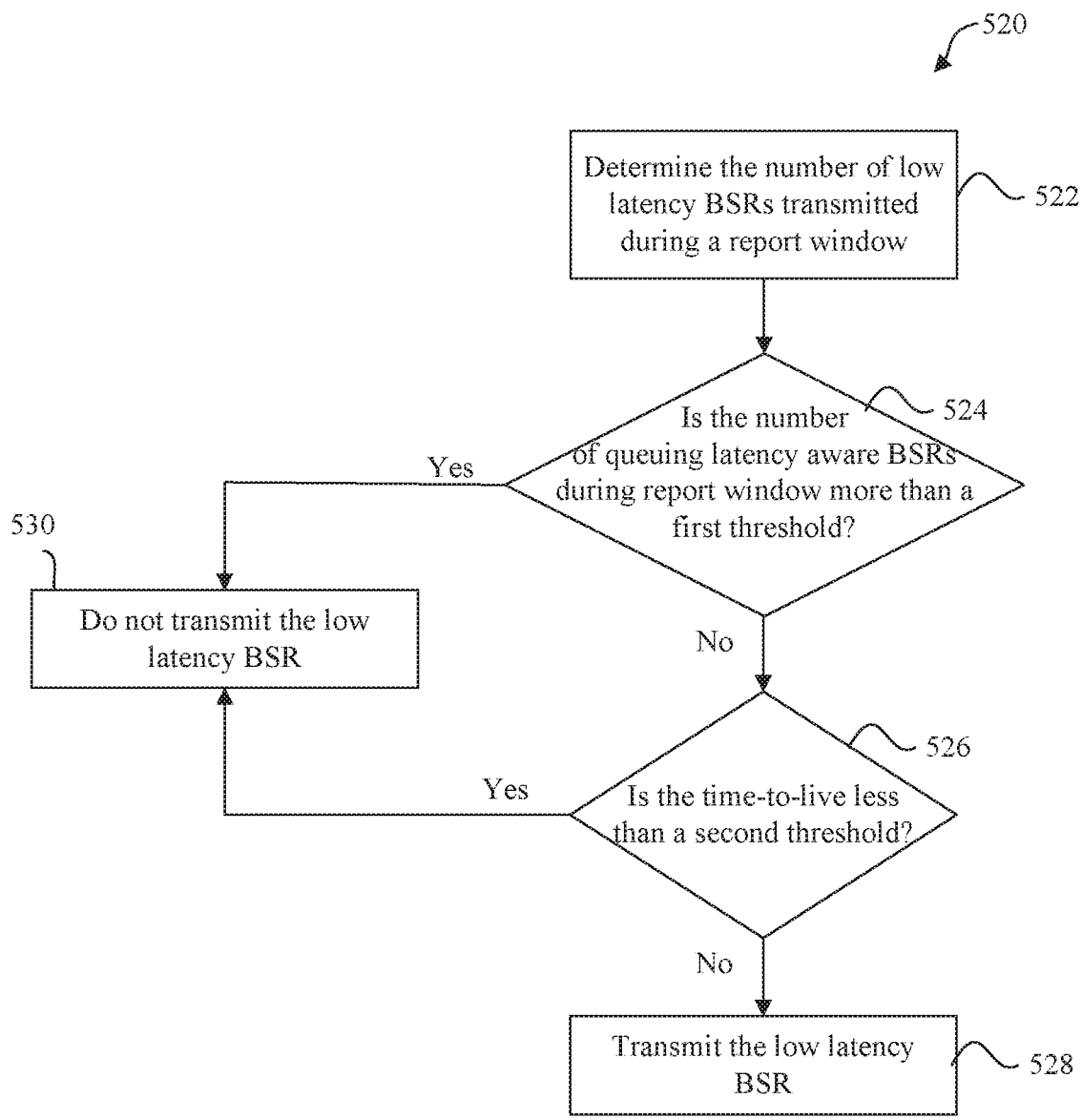
FIG. 5B illustrates an example method for a wireless system supporting generating the queuing latency aware BSR, according to some embodiments of the disclosure.

FIG. 5B illustrates an example method 520 for a wireless system supporting generating the queuing latency aware BSR, according to some embodiments of the disclosure. As a convenience and not a limitation, FIG. 5B may be described with regard to elements of FIGS. 1-4 and 5A. Method 520 may represent the operation of station (STA) 120a of FIG. 1 implementing queuing latency aware BSR. Method 520 may also be performed by system 200 of FIG. 2 and/or computer system 600 of FIG. 6. But method 500 is not limited to the specific embodiments depicted in those figures and other systems may be used to perform the method as will be understood by those skilled in the art. It is to be appreciated that not all operations may be needed, and the operations may not be performed in the same order as shown in FIG. 5B.

According to some embodiments method 520 can be part of step 510 of FIG. 5A. Using method 520, STA 120a can use the determined queuing time and the determined time-to-live information and also the parameters and/or rules associated with the queuing latency aware BSR to determine whether STA 120a can generate and transmit the queuing latency aware BSR.

At 522, STA 120a determines a number of queuing latency aware BSRs transmitted by STA 120a within a time window represented by the report window. In some examples, the report window can be report window 407 that is transmitted by, for example, AP 110 using frame fields 401 of FIG. 4. In some embodiments, STA 120a can use a counter to keep track of the queuing latency aware BSRs that STA 120a transmits during the report window. However, the embodiments of this disclosure are not limited to this example, and STA 120a can use different methods to determine the number of queuing latency aware BSRs that STA 120a has transmitted during each report window.

At 524, STA 120a compares the determined number of queuing latency aware BSRs with a first threshold. In some examples, the first threshold can include the number-of-BSRs threshold 405 transmitted by, for example, AP 110 using frame fields 401 of FIG. 4. If the determined number of queuing latency aware BSRs exceeds the first threshold, then method 520 moves to step 530 where STA 120a does not generate and/or transmit any new queuing latency aware BSR until the current report window is expired. According to some embodiments, steps 522 and 524 of method 520 can be performed before step 502 or after step 502 but before steps 504-508 of FIG. 5A.

If the determined number of queuing latency aware BSRs does not exceed the first threshold, then method 520 moves to step 526. At 526, a determined time-to-live is compared to a second threshold. For example, STA 120a determines the time-to-live at 506 of method 500 and at 526, STA 120a compares the determined time-to-live to the second threshold. In some examples, the second threshold can include time-to-live threshold 403 that is transmitted by, for example, AP 110 using frame fields 401 of FIG. 4.

If the determined time-to-live is less than the second threshold, then method 520 moves to step 530 where STA 120a does not generate and/or transmit a new queuing latency aware BSR. If the determined time-to-live exceeds the second threshold, then method 520 moves to step 528 where the low latency BSR is generated and/or is transmitted.

In some embodiments, if the determined time-to-live is less than the second threshold, instead of not generating and/or not transmitting the new queuing latency aware BSR, STA 120a can generate a new queuing latency aware BSR but without the determined time-to-live. Additionally or alternatively, STA 120a can generate a new queuing latency aware BSR with the time-to-live information being set to the second threshold.

Figure 6:
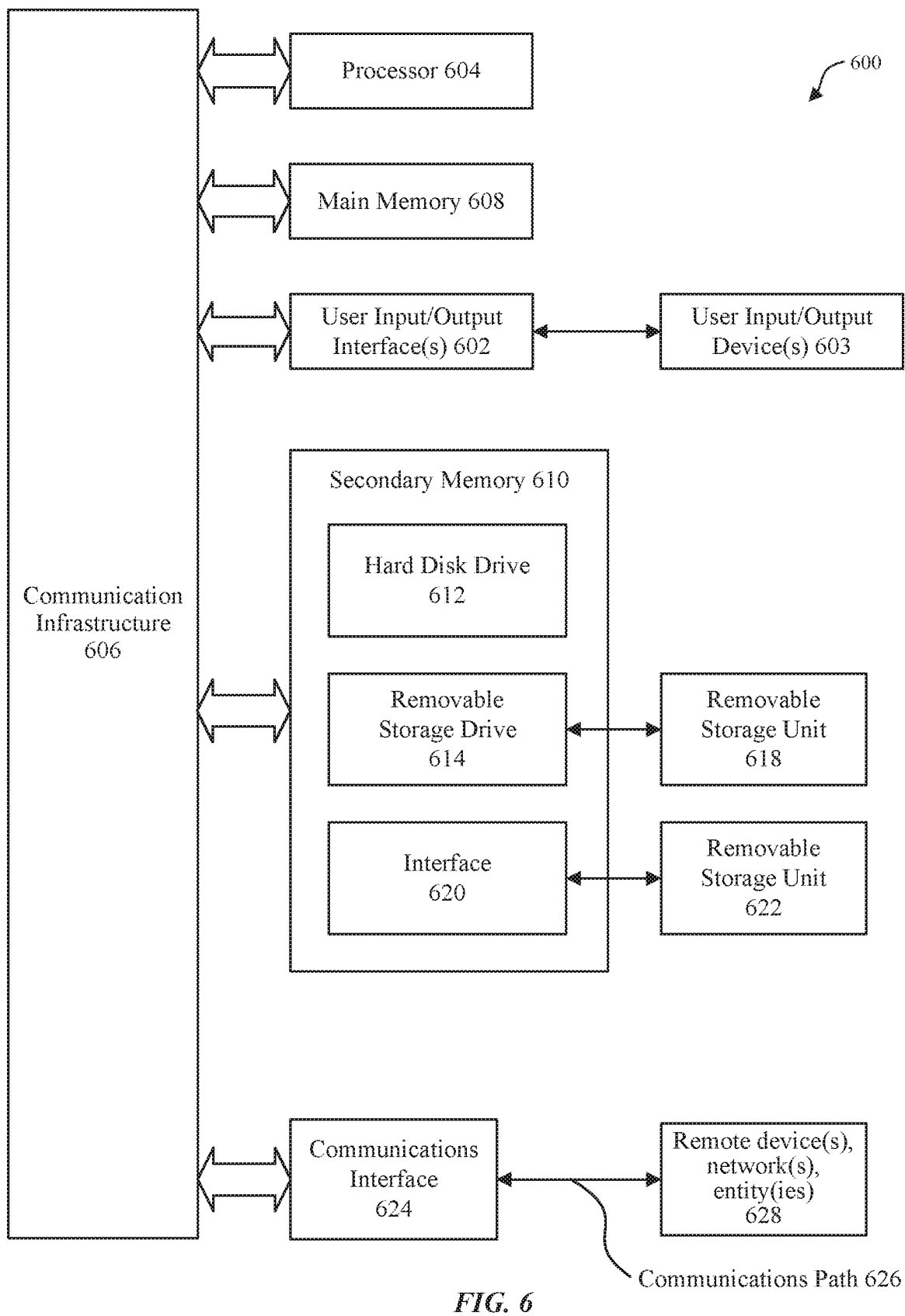
FIG. 6 is an example computer system for implementing some embodiments or portion(s) thereof.

Various embodiments can be implemented, for example, using one or more computer systems, such as computer system 600 shown in FIG. 6. Computer system 600 can be any well-known computer capable of performing the functions described herein such as devices 110, 120 of FIG. 1, or 200 of FIG. 2. Computer system 600 includes one or more processors (also called central processing units, or CPUs), such as a processor 604. Processor 604 is connected to a communication infrastructure 606 (e.g., a bus.) Computer system 600 also includes user input/output device(s) 603, such as monitors, keyboards, pointing devices, etc., that communicate with communication infrastructure 606 through user input/output interface(s) 602. Computer system 600 also includes a main or primary memory 608, such as random access memory (RAM). Main memory 608 may include one or more levels of cache. Main memory 608 has stored therein control logic (e.g., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to some embodiments, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

The operations in the preceding embodiments can be implemented in a wide variety of configurations and architectures. Therefore, some or all of the operations in the preceding embodiments may be performed in hardware, in software or both. In some embodiments, a tangible, non-transitory apparatus or article of manufacture includes a tangible, non-transitory computer useable or readable medium having control logic (software) stored thereon is also referred to herein as a computer program product or program storage device. This includes, but is not limited to, computer system 600, main memory 608, secondary memory 610 and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 6. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

What is claimed is:

1. An electronic device, comprising:
a transceiver configured to communicate over a wireless network; and
one or more processors communicatively coupled to the transceiver and configured to:
determine an amount of queued data in a buffer for transmission over the wireless network;
determine latency information associated with the queued data, wherein the latency information comprises a queuing time associated with the queued data, time-to-live information associated with the queued data indicating a deadline for transmission of the queued data, and a next data burst arrival time for the buffer indicating a time when a next burst of data is expected to arrive;
generate a queuing latency aware buffer status report (BSR) based at least on the determined latency information; and
transmit, using the transceiver, the queuing latency aware BSR to an access point.

2. The electronic device of claim 1, wherein the queuing time comprises one of a maximum queuing time associated with the queued data or an average queuing time associated with the queued data.

3. The electronic device of claim 1, wherein the queuing latency aware BSR is part of a medium access control (MAC) header of a frame, and wherein the frame comprises a data frame or a quality of service (QoS) null frame.

4. The electronic device of claim 3, wherein the queuing latency aware BSR is part of a high throughput (HT) field of the MAC header of the frame.

5. The electronic device of claim 4, wherein the amount of the queued data is transmitted to the access point using a QoS control field of the MAC header.

6. The electronic device of claim 1, wherein the queuing latency aware BSR comprises at least two or more of a control identifier (ID) associated with the queuing latency aware BSR, the amount of the queued data, the queuing time associated with the queued data, the time-to-live information associated with the queued data, or the next data burst arrival time for the buffer.

7. The electronic device of claim 1, wherein the one or more processors are further configured to:
receive a frame from the access point, wherein the frame comprises a time-to-live threshold, a number-of-BSR threshold, and a report window;
determine that a number of queuing latency aware BSRs transmitted by the electronic device within the report window is less than the number-of-BSR threshold; and
determine that time-to-live information associated with the queued data exceeds the time-to-live threshold.

8. A method, comprising:
receiving a frame from an access point, wherein the frame comprises one or more parameters;
determining an amount of queued data in a buffer for transmission over a wireless network associated with the access point;
determining latency information associated with the queued data, wherein the latency information comprises a queuing time associated with the queued data indicating an amount of time the queued data has been queued in the buffer, time-to-live information associated with the queued data indicating a deadline when the queued data is to be transmitted, and a next data burst arrival time for the buffer indicating a time when a next burst of data is expected to arrive;
in response to the latency information being within the one or more parameters, generating a queuing latency aware buffer status report (BSR) based at least on the determined latency information; and
transmitting the queuing latency aware BSR to the access point.

9. The method of claim 8, wherein the queuing time comprises one of a maximum queuing time associated with the queued data or an average queuing time associated with the queued data.

10. The method of claim 8, wherein the one or more parameters comprise a time-to-live threshold, a number-of-BSR threshold, and a report window and the method further comprising:
determining that a number of queuing latency aware BSRs transmitted within the report window is less than the number-of-BSR threshold; and
determining that time-to-live information associated with the queued data exceeds the time-to-live threshold.

11. The method of claim 8, wherein the queuing latency aware BSR comprises a field comprising a control identifier (ID) associated with the queuing latency aware BSR, the amount of the queued data, the queuing time associated with the queued data, the time-to-live information associated with the queued data, and the next data burst arrival time for the buffer.

12. The method of claim 11, wherein the queuing latency aware BSR is part of a high throughput (HT)field of a medium access control (MAC) header of a data frame or a quality of service (QoS) null frame.

13. A non-transitory computer-readable medium storing instructions that, when executed by a processor of an electronic device, cause the processor to perform operations, the operations comprising:
determining latency information associated with queued data in a buffer for transmission over a wireless network, wherein the latency information comprises a queuing time associated with the queued data, time-to-live information associated with the queued data indicating a deadline when the queued data is to be transmitted, and a next data burst arrival time for the buffer indicating a time when a next burst of data is expected to arrive;
generating a queuing latency aware buffer status report (BSR) based at least on the determined latency information; and
transmitting the queuing latency aware BSR to an access point.

14. The non-transitory computer-readable medium of claim 13, wherein the operations further comprising:
receiving a frame from the access point, wherein the frame comprises a time-to-live threshold, a number-of-BSR threshold, and a report window;
before transmitting the queuing latency aware BSR, determining that a number of queuing latency aware BSRs transmitted by the electronic device within the report window is less than the number-of-BSR threshold; and
determining that the time-to-live information associated with the queued data exceeds the time-to-live threshold.

15. The non-transitory computer-readable medium of claim 13, wherein generating the queuing latency aware BSR comprises generating a field comprising a control identifier (ID) associated with the queuing latency aware BSR, a number of bytes of the queued data, the queuing time associated with the queued data, the time-to-live information associated with the queued data, and the next data burst arrival time for the buffer.

16. The non-transitory computer-readable medium of claim 15, wherein the queuing latency aware BSR is part of a high throughput (HT) field of a medium access control (MAC) header of a data frame or a quality of service (QoS) null frame.

* * * * *